United States Patent
Bellis, II et al.

(10) Patent No.: US 7,265,794 B2
(45) Date of Patent: Sep. 4, 2007

(54) MANAGING THE COLOR TEMPERATURE FOR A LIGHT SOURCE ARRAY

(75) Inventors: Harold E. Bellis, II, Garland, TX (US); Erin Patricia Murphy Smoyer, Farmersville, TX (US); Nguyen Trong Ho, Highland Village, TX (US)

(73) Assignee: Texas Instruments Incorporated, Dallas, TX (US)

( * ) Notice: Subject to any disclaimer, the term of this patent is extended or adjusted under 35 U.S.C. 154(b) by 187 days.

(21) Appl. No.: 11/219,598

(22) Filed: Sep. 1, 2005

(65) Prior Publication Data

US 2007/0046826 A1    Mar. 1, 2007

(51) Int. Cl.
*H04N 9/68* (2006.01)
(52) U.S. Cl. .................................. 348/655
(58) Field of Classification Search ............... 348/655, 348/656, 651, 653, 742, 743, 649; 382/167; 315/149
See application file for complete search history.

(56) References Cited

U.S. PATENT DOCUMENTS

| | | | |
|---|---|---|---|
| 6,127,783 A | 10/2000 | Pashley et al. | |
| 6,441,558 B1* | 8/2002 | Muthu et al. ............... | 315/149 |
| 6,535,190 B2* | 3/2003 | Evanicky ..................... | 345/88 |
| 6,594,387 B1 | 7/2003 | Pettitt et al. | |
| 6,940,559 B2* | 9/2005 | Kumakura et al. ......... | 348/650 |
| 7,165,847 B2* | 1/2007 | Pettitt ......................... | 353/84 |
| 7,181,065 B2* | 2/2007 | Pettitt et al. ................ | 382/167 |
| 2005/0174473 A1* | 8/2005 | Morgan et al. ............. | 348/370 |
| 2006/0237636 A1* | 10/2006 | Lyons et al. ................ | 250/228 |

OTHER PUBLICATIONS

Craig DiLouie, White Paper—Controlling LED Lighting Systems, http://www.aboutlightingcontrols.org/education/papers/controlLED.shtml, 11 pages, 2003.
Gerard Harbers, et al., Performance of High Power LED Illuminators in Color Sequential Projection Displays, http://www.lumileds.com/solutions/LCD/03IDWHarbers.pdf, 4 pages, Printed Aug. 31, 2005.

* cited by examiner

*Primary Examiner*—Paulos Natnael
(74) *Attorney, Agent, or Firm*—Wade James Brady, III; Frederick J. Telecky, Jr.

(57) ABSTRACT

Providing color management includes receiving measurements of the intensity of colors. A light source generates light beams to yield the colors, where the light beams are generated in accordance to image data to create an image. A target color value is established. A duty cycle sequence operable to control the light source is selected in accordance with the measurements and the target color value. Current levels for currents provided to the light source are selected in accordance with the duty cycle sequence and the target color value.

20 Claims, 1 Drawing Sheet

MANAGING THE COLOR TEMPERATURE FOR A LIGHT SOURCE ARRAY

TECHNICAL FIELD

This invention relates generally to the field of image generation and more specifically to managing the color temperature for a light source array.

BACKGROUND

Light processing systems often involve directing light towards a display such that an image is produced. One way of effecting such an image is through the use of digital micromirror devices (DMD) available from Texas Instruments. In general, light is shined on a DMD array having numerous micromirrors. Each micromirror is selectively controlled to reflect the light towards a particular portion of a display, such as a pixel. The angle of a micromirror can be changed to switch a pixel to an "on" or "off" state. The micromirrors can maintain their on or off state for controlled display times.

The light provided to a DMD array may be generated by a light-emitting diode (LED) array. The current-to-lumens output of an LED array may change in response to temperature and as a result of device aging. Accordingly, the color temperature may be managed. Known techniques for managing the color temperature, however, are not satisfactory in certain situations. It is generally desirable to have a satisfactory management of the color temperature in certain situations.

SUMMARY OF THE DISCLOSURE

In accordance with the present invention, disadvantages and problems associated with previous techniques for managing color temperature may be reduced or eliminated.

According to one embodiment of the present invention, providing color management includes receiving measurements of the intensity of colors. A light source generates light beams to yield the colors, where the light beams are generated in accordance to image data to create an image. A target color value is established. A duty cycle sequence operable to control the light source is selected in accordance with the measurements and the target color value. Current levels for currents provided to the light source are selected in accordance with the duty cycle sequence and the target color value.

Certain embodiments of the invention may provide one or more technical advantages. A technical advantage of one embodiment may be that current levels and duty cycle sequences provided to a light source array are synchronized in order to manage the color temperature or xy location of the array. The color management may yield an appropriate color temperature or xy location while optimizing the lumens output of the light source array.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
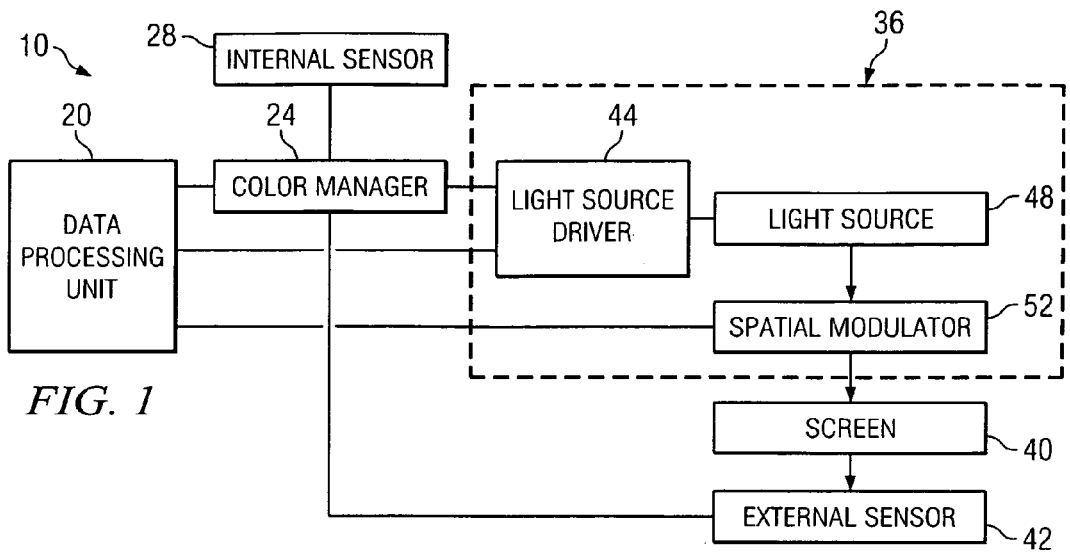
FIG. 1 is a block diagram illustrating one embodiment of a system for providing color management for a light source array.
Figure 2:
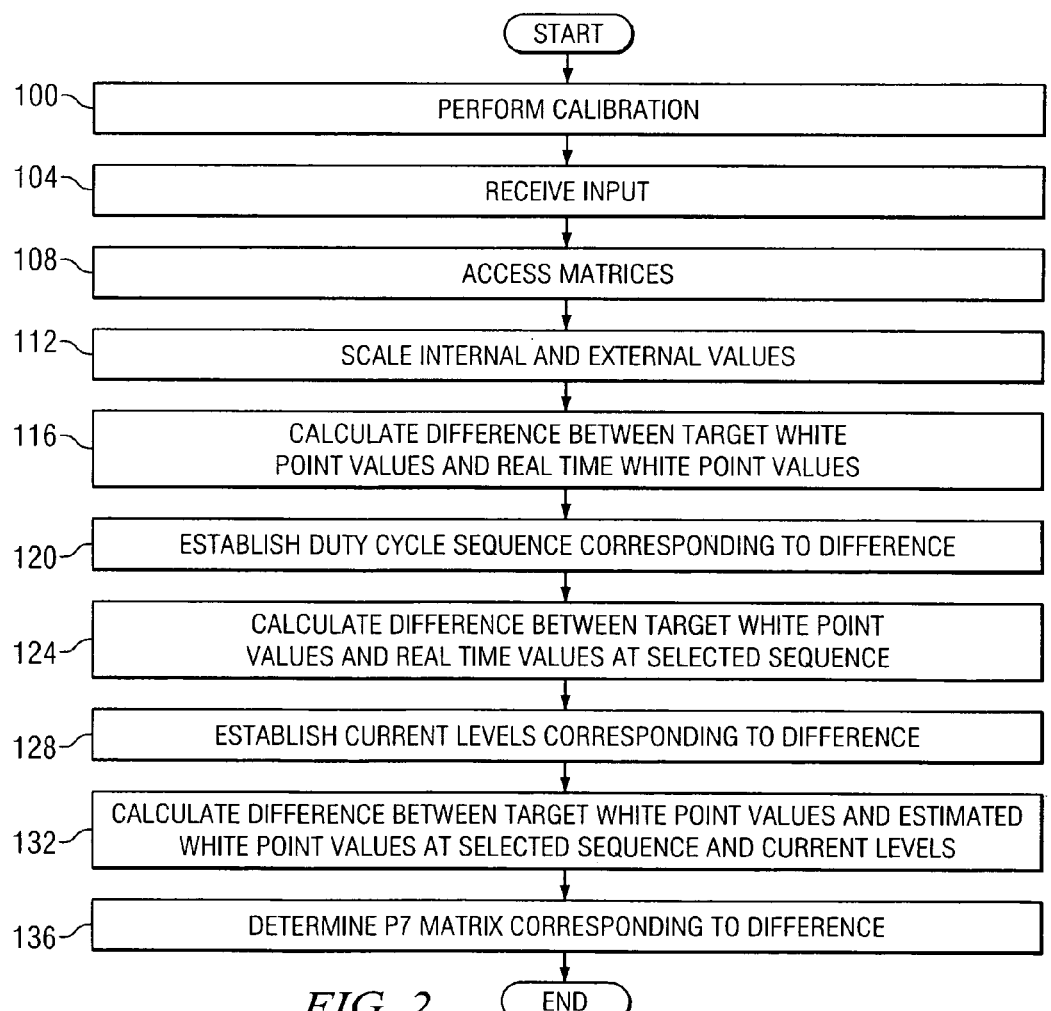
FIG. 2 is a flowchart illustrating one embodiment of a method for providing color management for a light source array.

Embodiments of the present invention and its advantages are best understood by referring to FIGS. 1 and 2 of the drawings, like numerals being used for like and corresponding parts of the various drawings.

FIG. 1 is a block diagram illustrating one embodiment of a system 10 for providing color management for a light source array. According to the embodiment, system 10 may synchronize current levels and duty cycle sequences in order to manage the color temperature or xy location of a light source array.

In general, the current level of a current provided to a light source array may be controlled to provide color management. The range in which the current level adjustment can provide appropriate color management, however, is limited. Moreover, duty cycle sequences that control the duty cycle for colors may also be used for color management. Typically, only a certain number of sequences are available, however, and switching abruptly from one sequence to another sequence may yield a discontinuity.

According to one embodiment, system 10 coordinates duty cycle control and current level control. Duty cycle sequences may be selected in order to provide a coarse adjustment. A sequence may be selected to maintain a current level in the range in which appropriate color management adjustment may be provided. Once in the range, the current level may be adjusted to provide a fine adjustment.

According to the illustrated embodiment, system 10 includes a data processing unit 20, a color manager 24, an internal sensor 28, and a projector 36, which includes a light source driver 44, a light source 48, and a spatial modulator 52. Projector 36 projects an image on a screen 40, and external sensor 28 detects the image. In general, color manager 24 uses image data and control information from data processing unit 20 and measurements from internal sensor 28 and external sensor 42 to provide color management for projector 36. Image data may refer to data that is used to generate an image on screen 40. Control information may refer to instructions that are used to control components of system 10 to process the image data. As an example, a duty cycle sequence controls when and how light beams are provided to spatial modulator 52. The sequence may also control when and which elements of a light source 48 are turned on and off.

System 10 controls the projection of colors on screen 40 to generate an image. Colors may be defined as (x,y) points of the International Commission on Illumination (CIE) chromaticity diagram. Primary colors are colors with a controllable intensity. Any suitable primaries may be used. As an example, primaries may include red, green, blue, yellow, cyan, magenta, other primary, or any suitable combination of the preceding. One or more light elements of light source 48 may be used to generate a primary.

Primaries may be combined with specific intensities to yield a combined color. The (x,y) point of the combined color may be calculated from the (x,y) points and the intensity of the primaries. Changing the average intensity of the primaries may yield a combined color at a different (x,y) point.

The average intensity of the primaries may be changed by adjusting the display time, intensity, or both display time and intensity of a primary. According to one embodiment, light source 48 comprises an LED array. The amount of time may be controlled by adjusting the duty cycle sequence of an LED or by adjusting the image data. The intensity may be controlled by adjusting the current level of the current provided to the LED and the number of active LEDs.

According to the illustrated embodiment, data processing unit 20 may provide image data and control information to other components of system 10. As an example, data processing unit 20 may provide timing signals and user controls to color manager 24. Data processing unit 20 may also provide duty cycle sequences selected by color manager 24 to light source driver 44.

Color manager 24 provides color management for system 10. Color manager 24 may send control information to other components to provide color management. As an example, color manager 24 may provide current control information to light source driver 44 that instructs light source driver 44 to provide light source 48 with the selected current levels. Color manager 24 may also provide sequence control information to data processing unit 20. The sequence control information may include selected duty cycle sequences for light source driver 44. Color manager 24 may use any suitable method to provide color management. An example method is described with reference to FIG. 2.

Internal sensor 28 measures lumens output by the primaries. Internal sensor 28 may include any suitable number of detectors, for example, three or more detectors, each with a filter to restrict the measured wavelength. The filter characteristics may overlap to allow for wavelength determination based upon the measurements.

Internal sensor 28 may be placed in any suitable location of system 10. As an example, internal sensor 28 may be placed in the light path between light source 48 and spatial modulator 52. As another example, internal sensor 28 may be placed in the off-state light between spatial modulator 52 and screen 40.

Internal sensor 28 may provide sets of measurements. A first set of measurements may be taken under the same conditions as the calibration data. These measurements may be used to allow a correction process to track the performance of the output of the LED array. A second set of measurements may be taken under varying current levels, for example, any suitable levels between a maximum LED current level and a minimum LED current level. The measurements may be recorded in a table that may be updated. A third set of measurements may be taken at full power to measure individual LED strings. The measurements may be used to detect a failure of an LED string. If the lumens output for a string is below an acceptable level, the string may be disabled.

Projector 36 directs light towards screen 40 to generate an image. Projector 36 may comprise any suitable components or combination of components for directing light towards screen 40. According to the illustrated embodiment, projector 36 may comprise a light source driver 44, a light source 48, and a spatial modulator 52.

Light source driver 44 receives image data and control information, and instructs light source 48 to emit light beams towards spatial modulator 52 in accordance with the image data and control information. A "light beam" may refer to a beam of light radiation, and may comprise a laser beam. Example light sources may include semiconductor lasers, light-emitting diodes (LEDs), injection laser diodes (ILDs), vertical cavity surface emitting diodes (VCSELs), an array of light sources, lasers, or any other suitable source that emits light beams. According to one embodiment, light source 48 may comprise an LED array, that includes strings of one or more LEDs. The strings may be driven at a common current level or different current levels.

Spatial modulator 52 spatially modulates light received from light source 48, and directs the spatially modulated light beams to screen 40. Spatial modulator 52 may comprise any device capable of selectively communicating at least some light beams to screen 40. Data processing unit 20 may be operable to configure and program spatial modulator 52 to process analog signals with digital precision.

According to one embodiment, the modulator comprises a digital micromirror device (DMD). A DMD may refer to a digital form of a spatial light modulator that comprises an electromechanical device including a pixel array. The pixel array may comprise an array, such as a 768×1024 array, of digital tilting mirrors or baseline binary pixels or mirrors. A binary mirror may tilt by a plus or minus angle of, for example, 10 or 12 degrees, for active "on" or "off" positions. A mirror may include an actuator that permits the mirror to tilt. An actuator may comprise hinges mounted on support posts over underlying control circuitry. The control circuitry provides electrostatic forces that cause each mirror to selectively tilt.

External sensor 42 measures the intensity of light after the light beams travel a complete optical path. A complete optical path may include screen 40 and a path between screen 40 and a viewer. External sensor 42 may include any suitable number of detectors, for example, three or more detectors.

One or more components of system 10 may include appropriate input devices, output devices, mass storage media, processors, memory, or other components for receiving, processing, storing, or communicating information according to the operation of system 10. As an example, one or more components of system 10 may include logic, an interface, memory, other component, or any suitable combination of the preceding. "Logic" may refer to hardware, software, other logic, or any suitable combination of the preceding. Certain logic may manage the operation of a device, and may comprise, for example, a field programmable gate array (FPGA) or a digital signal processor (DSP). "Processor" may refer to any suitable device operable to execute instructions and manipulate data to perform operations.

"Interface" may refer to logic of a device operable to receive input for the device, send output from the device, perform suitable processing of the input or output or both, or any combination of the preceding, and may comprise one or more ports, conversion software, or both. "Memory" may refer to logic operable to store and facilitate retrieval of information, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

Modifications, additions, or omissions may be made to system 10 without departing from the scope of the invention. The components of system 10 may be integrated or separated according to particular needs. Moreover, the operations of system 10 may be performed by more, fewer, or other modules. For example, the operations of light source driver 44 and light source 48 may be performed by one module, or the operations of color manager 24 may be performed by more than one module. As used in this document, "each" refers to each member of a set or each member of a subset of a set.

FIG. 2 is a flowchart illustrating one embodiment of a method for providing color management for a light source array. The method may be used to determine duty cycle sequences that may maintain current levels in a particular range, and to determine the current levels that may provide color management. The method may also be used to alter an identity matrix that may adjust video data to provide color management. According to the embodiment, the light source is assumed to comprise stable LEDs.

According to the embodiment, internal and external measurements may be taken simultaneously as an average of a number of sample measurements. Internal measurements may be designated using ABC values, and external measurements may be designated using XYZ values. Duty cycle sequences may be designated using RGB values. In the example, "[ ]" represents matrix operations, and "( )" represents element by element operations. Also, "$DEF_{GH}$" represents $D_{GH}$, $E_{GH}$, and $F_{GH}$.

The method begins at step 100, where calibration is performed. During calibration, internal measurements are correlated with external measurements. Any suitable parameters may be calibrated. As an example, the duty cycle sequences $RGB_{DCcal}$ may be calibrated. As another example, full color parameters may be calibrated. Full color parameters may include red, green, and blue full color parameters, which may each include external xyY parameters and internal ABC parameters. Red full color parameters may include external parameters $xyY_{rcal}$ and internal parameters $ABC_{rcal}$; green full color parameters may include external parameters $xyY_{gcal}$ and internal parameters $ABC_{gcal}$; and blue full color parameters may include external parameters $xyY_{bcal}$ and internal parameters $ABC_{bcal}$.

Inputs are received at step 104. Inputs may include target white point values $XYZ_{wp}$ for each white point. Inputs may also include information about the system, for example, available duty cycle sequences and real time duty cycle sequences $RGB_{DCrt}$. System information may also include a real time current lookup table (LUT) that associates values $ABC_{xc}$, x=r, g, and b to current levels. System information may also include real time red, green, and blue peak parameters $ABC_{xrt}$, x=r, g, and b measured at the maximum current level.

Inputs may also include a p7 matrix. A p7 matrix may be used to adjust the image data in an enhanced color correction technique. An example p7 matrix is described in U.S. Pat. No. 6,594,387, which is hereby incorporated by reference. A p7 matrix may be defined according to Equation (1):

$$\begin{bmatrix} 1 & 0 & 0 & 0 & 1 & 1 & 1 \\ 0 & 1 & 0 & 1 & 0 & 1 & 1 \\ 0 & 0 & 1 & 1 & 1 & 0 & 1 \end{bmatrix} = p7i \quad (1)$$

The method generates output, which may include a next duty cycle sequence $RGB_{seq}$, next current levels $RGB_c$, and a next p7 matrix that may provide color management.

Matrices are accessed at step 108. The matrices may include an external system matrix and an internal system matrix that may be used to generate a full system matrix. The external system matrix may be given by Equation (2):

$$\begin{bmatrix} X_r & X_g & X_b \\ Y_r & Y_g & Y_b \\ Z_r & Z_g & Z_b \end{bmatrix} \quad (2)$$

where:

$$X_{wcal} = X_{rcal} + X_{gcal} + X_{bcal}$$
$$Y_{wcal} = Y_{rcal} + Y_{gcal} + Y_{bcal}$$
$$Z_{wcal} = Z_{rcal} + Z_{gcal} + Z_{bcal}$$

$$\begin{pmatrix} k_x \\ k_y \\ k_z \end{pmatrix} = \begin{bmatrix} x_{rcal} & x_{gcal} & x_{bcal} \\ y_{rcal} & y_{gcal} & y_{bcal} \\ z_{rcal} & z_{gcal} & z_{bcal} \end{bmatrix}^{-1} * \begin{bmatrix} \left(\frac{X_{wcal}}{Y_{wcal}}\right) \\ 1 \\ \left(\frac{Z_{wcal}}{Y_{wcal}}\right) \end{bmatrix}$$

$$\begin{bmatrix} X_r & X_g & X_b \\ Y_r & Y_g & Y_b \\ Z_r & Z_g & Z_b \end{bmatrix} = \begin{bmatrix} x_{rcal} & x_{gcal} & x_{bcal} \\ y_{rcal} & y_{gcal} & y_{bcal} \\ z_{rcal} & z_{gcal} & z_{bcal} \end{bmatrix} * \begin{bmatrix} k_x & 0 & 0 \\ 0 & k_y & 0 \\ 0 & 0 & k_z \end{bmatrix} \text{ and}$$

$$i = r, g, b, w,$$
$$z_i = 1 - x_i - y_i,$$
$$X_i = \frac{x_i}{y_i} Y_i, \text{ and}$$
$$Z_i = \frac{z_i}{y_i} Y_i.$$

The internal system matrix may be given by Equation (3):

$$\begin{bmatrix} A_r & A_g & A_b \\ B_r & B_g & B_b \\ C_r & C_g & C_b \end{bmatrix} \quad (3)$$

where:

$$A_{wcal} = A_{rcal} + A_{gcal} + A_{bcal}$$
$$B_{wcal} = B_{rcal} + B_{gcal} + B_{bcal}$$
$$C_{wcal} = C_{rcal} + C_{gcal} + C_{bcal}$$

$$\begin{pmatrix} k_a \\ k_b \\ k_c \end{pmatrix} = \begin{bmatrix} a_{rcal} & a_{gcal} & a_{bcal} \\ b_{rcal} & b_{gcal} & b_{bcal} \\ c_{rcal} & c_{gcal} & c_{bcal} \end{bmatrix}^{-1} * \begin{bmatrix} \left(\frac{A_{wcal}}{B_{wcal}}\right) \\ 1 \\ \left(\frac{C_{wcal}}{B_{wcal}}\right) \end{bmatrix}$$

$$\begin{bmatrix} A_r & A_g & A_b \\ B_r & B_g & B_b \\ C_r & C_g & C_b \end{bmatrix} = \begin{bmatrix} a_{rcal} & a_{gcal} & a_{bcal} \\ b_{rcal} & b_{gcal} & b_{bcal} \\ c_{rcal} & c_{gcal} & c_{bcal} \end{bmatrix} * \begin{bmatrix} k_a & 0 & 0 \\ 0 & k_b & 0 \\ 0 & 0 & k_c \end{bmatrix} \text{ and}$$

$$a_i = \frac{A_i}{A_i + B_i + C_i},$$
$$b_i = \frac{B_i}{A_i + B_i + C_i}, \text{ and}$$
$$c_i = \frac{C_i}{A_i + B_i + C_i}.$$

The internal system matrix and the inverse of the external system matrix may be multiplied together to create the full system matrix according to Equation (4):

$$\begin{bmatrix} I_r & I_g & I_b \\ J_r & J_g & J_b \\ K_r & K_g & K_b \end{bmatrix} = \begin{bmatrix} A_r & A_g & A_b \\ B_r & B_g & B_b \\ C_r & C_g & C_b \end{bmatrix} * \begin{bmatrix} X_r & X_g & X_b \\ Y_r & Y_g & Y_b \\ Z_r & Z_g & Z_b \end{bmatrix}^{-1} \quad (4)$$

The external and internal values are scaled at step 112. The external sensor can detect changes in the duty cycles, whereas the internal sensor cannot detect such changes. Accordingly, external values, such as the target white point values $XYZ_{wp}$, may be scaled by the calibration duty cycles. Scaling factors $XYZ_{sfactor}$ for white point values XYZ may be calculated according to Equation (5):

$$\begin{pmatrix} X_{sfactor} \\ Y_{sfactor} \\ Z_{sfactor} \end{pmatrix} = \frac{\begin{bmatrix} X_r & X_g & X_b \\ Y_r & Y_g & Y_b \\ Z_r & Z_g & Z_b \end{bmatrix} * \begin{bmatrix} (R_{DCcal}) \\ (G_{DCcal}) \\ (B_{DCcal}) \end{bmatrix}}{\begin{pmatrix} \left(\frac{X_{wcal}}{Y_{wcal}}\right) \\ 1 \\ \left(\frac{Z_{wcal}}{Y_{wcal}}\right) \end{pmatrix}} \quad (5)$$

Scaled white point values $XYZ_{scaledwp}$ may be calculated according to Equation (6):

$$\begin{pmatrix} X_{scaledwp} \\ Y_{scaledwp} \\ Z_{scaledwp} \end{pmatrix} = \begin{pmatrix} X_{wp} \\ Y_{wp} \\ Z_{wp} \end{pmatrix} * \begin{pmatrix} X_{sfactor} \\ Y_{sfactor} \\ Z_{sfactor} \end{pmatrix} \quad (6)$$

Steps 116 and 120 are performed to select duty cycle sequences. The difference $RGB_{\%diff1}$ between target white point values $ABC_{wp}$ and real time white point values $ABC_{rt}$ is calculated at step 116. The difference may be calculated in any suitable manner. According to one embodiment, the target white point values $ABC_{wp}$ may be determined by calculating the ABC values for white when the target white point is achieved, and may be calculated according to Equation (7):

$$\begin{pmatrix} A_{wp} \\ B_{wp} \\ C_{wp} \end{pmatrix} = \begin{bmatrix} I_r & I_g & I_b \\ J_r & J_g & J_b \\ K_r & K_g & K_b \end{bmatrix} * \begin{bmatrix} X_{scaledwp} \\ Y_{scaledwp} \\ Z_{scaledwp} \end{bmatrix} \quad (7)$$

The values $ABC_{wp}$ may be normalized so that they can be compared to other ABC values, and may be normalized according to Equations (8) to yield normalized target white point values $nABC_{wp}$:

$$nA_{wp} = \frac{A_{wp}}{A_{wp} + B_{wp} + C_{wp}} \quad (8)$$

$$nB_{wp} = \frac{B_{wp}}{A_{wp} + B_{wp} + C_{wp}}$$

$$nC_{wp} = \frac{C_{wp}}{A_{wp} + B_{wp} + C_{wp}}$$

The real time white point values $ABC_{wrt}$ may be calculated according to Equation (9):

$$\begin{pmatrix} A_{wrt} \\ B_{wrt} \\ C_{wrt} \end{pmatrix} = \begin{bmatrix} A_{rrt} & A_{grt} & A_{brt} \\ B_{rrt} & B_{grt} & B_{brt} \\ C_{rrt} & C_{grt} & C_{brt} \end{bmatrix} * \begin{bmatrix} R_{DCrt} \\ G_{DCrt} \\ B_{DCrt} \end{bmatrix} \quad (9)$$

The values $ABC_{wrt}$ may be normalized according to Equations (10) to yield normalized real time white point values $nABC_{wrt}$:

$$nA_{wrt} = \frac{A_{wrt}}{A_{wrt} + B_{wrt} + C_{wrt}} \quad (10)$$

$$nB_{wrt} = \frac{B_{wrt}}{A_{wrt} + B_{wrt} + C_{wrt}}$$

$$nC_{wrt} = \frac{C_{wrt}}{A_{wrt} + B_{wrt} + C_{wrt}}$$

The percent differences $RGB_{\%diff1}$ between the normalized target white point values $ABC_{wp}$ and the normalized real time white point values $ABC_{wrt}$ may be calculated according to Equation (11):

$$\begin{pmatrix} R_{\%diff1} \\ G_{\%diff1} \\ B_{\%diff1} \end{pmatrix} = \frac{\left(\begin{pmatrix} nA_{wp} \\ nB_{wp} \\ nC_{wp} \end{pmatrix} - \begin{pmatrix} nA_{wrt} \\ nB_{wrt} \\ nC_{wrt} \end{pmatrix}\right)}{\begin{pmatrix} nA_{wp} \\ nB_{wp} \\ nC_{wp} \end{pmatrix}} \quad (11)$$

Duty cycles that correspond to the difference are established at step 120. The duty cycles may be established in any suitable manner. According to one embodiment, next duty cycles $RGB_{DC}$ may be determined according to Equation (12):

$$\begin{pmatrix} R_{DC} \\ G_{DC} \\ B_{DC} \end{pmatrix} = \begin{pmatrix} R_{DCrt} \\ G_{DCrt} \\ B_{DCrt} \end{pmatrix} * \begin{pmatrix} R_{\%diff1} \\ G_{\%diff1} \\ B_{\%diff1} \end{pmatrix} + \begin{pmatrix} R_{DCrt} \\ G_{DCrt} \\ B_{DCrt} \end{pmatrix} \quad (12)$$

The duty cycles may be normalized according to Equations (13) to yield normalized duty cycles $nRGB_{DC}$:

$$nR_{DC} = \frac{R_{DC}}{R_{DC} + G_{DC} + B_{DC}} * 100 \quad (13)$$

$$nG_{DC} = \frac{G_{DC}}{R_{DC} + G_{DC} + B_{DC}} * 100$$

$$nB_{DC} = \frac{B_{DC}}{R_{DC} + G_{DC} + B_{DC}} * 100$$

An available sequence $RGB_{seq}$ with duty cycles that are closest to normalized next duty cycles $nRGB_{DC}$ may be selected.

Steps 124 and 128 are performed to select current levels. The percent differences $RGB_{\%diff2}$ between the target white point values $nABC_{wp}$ and internal white point values nAB- $C_{wseq}$ at the selected sequence is calculated at step 124. Internal white point values $ABC_{wseq}$ may be calculated according to Equation (14):

$$\begin{pmatrix} A_{wseq} \\ B_{wseq} \\ C_{wseq} \end{pmatrix} = \begin{bmatrix} A_{rrt} & A_{grt} & A_{brt} \\ B_{rrt} & B_{grt} & B_{brt} \\ C_{rrt} & C_{grt} & C_{brt} \end{bmatrix} * \begin{bmatrix} R_{seq} \\ G_{seq} \\ B_{seq} \end{bmatrix} \quad (14)$$

The internal white point values $ABC_{wseq}$ may be normalized according to Equations (15) to yield normalized internal white point values $nABC_{wseq}$:

$$nA_{wseq} = \frac{A_{wseq}}{A_{wseq} + B_{wseq} + C_{wseq}} \quad (15)$$

$$nB_{wseq} = \frac{B_{wseq}}{A_{wseq} + B_{wseq} + C_{wseq}}$$

$$nC_{wseq} = \frac{C_{wseq}}{A_{wseq} + B_{wseq} + C_{wseq}}$$

The difference $RGB_{\%diff2}$ may be calculated according to Equation (16):

$$\begin{pmatrix} R_{\%diff2} \\ G_{\%diff2} \\ B_{\%diff2} \end{pmatrix} = \frac{\left( \begin{pmatrix} nA_{wp} \\ nB_{wp} \\ nC_{wp} \end{pmatrix} - \begin{pmatrix} nA_{wseq} \\ nB_{wseq} \\ nC_{wseq} \end{pmatrix} \right)}{\begin{pmatrix} nA_{wp} \\ nB_{wp} \\ nC_{wp} \end{pmatrix}} + 1 \quad (16)$$

The difference $RGB_{\%diff2}$ may be normalized such that the maximum percent difference is one, and may be normalized according to Equation (17) to yield normalized difference $nRGB_{\%diff2}$:

$$nR_{\%diff2} = \frac{R_{\%diff2}}{\max(R_{\%diff2}, G_{\%diff2}, B_{\%diff2})} \quad (17)$$

$$nG_{\%diff2} = \frac{G_{\%diff2}}{\max(R_{\%diff2}, G_{\%diff2}, B_{\%diff2})}$$

$$nB_{\%diff2} = \frac{B_{\%diff2}}{\max(R_{\%diff2}, G_{\%diff2}, B_{\%diff2})}$$

The current level that corresponds to the difference $RGB_{\%diff2}$ is determined at step 128. The current level may be determined in any suitable manner. According to one embodiment, the red, green, and blue real time internal sensor ABC values may be scaled by percent differences $RGB_{\%diff2}$ according to Equation (18) to yield scaled values $ABC_{xscaled}$, x=r, g, and b:

$$A_{rscaled} = A_{rrt} * nR_{\%diff2}$$

$$B_{gscaled} = B_{grt} * nG_{\%diff2}$$

$$C_{bscaled} = C_{brt} * nB_{\%diff2} \quad (18)$$

Current levels corresponding to the difference are established at step 128. The current levels may be established by interpolating the current lookup table to determine interpolated current levels $iRGB_c$ corresponding to the scaled values $ABC_{xscaled}$. Current levels $RGB_c$ closest to the interpolated current levels $iRGB_c$ may be selected.

Steps 132 and 136 are performed to determine a p7 matrix that may be used to adjust image data to provide color management. The difference $RGB_{\%diff3}$ between the target white point values $nABC_{wp}$ and estimated white point values $nABC_{wcurr}$ based on the selected sequence and current levels is calculated at step 132. The difference $RGB_{\%diff3}$ may be calculated in any suitable manner. According to one embodiment, the estimated white point values $ABC_{wcurr}$ at the selected sequence and current levels may be determined according to Equation (19):

$$\begin{pmatrix} A_{wcurr} \\ B_{wcurr} \\ C_{wcurr} \end{pmatrix} = \begin{bmatrix} A_{rcurr} & A_{gcurr} & A_{bcurr} \\ B_{rcurr} & B_{gcurr} & B_{bcurr} \\ C_{rcurr} & C_{gcurr} & C_{bcurr} \end{bmatrix} * \begin{bmatrix} R_{seq} \\ G_{seq} \\ B_{seq} \end{bmatrix} \quad (19)$$

where $ABC_{xcurr}$, x=r, g, b, represent the ABC values of the internal sensor at the selected current levels. Values $ABC_{xcurr}$ may be established by interpolating the current lookup table to determine the $ABC_{xc}$ values corresponding to the available current levels.

The estimated white point values $ABC_{wcurr}$ may be normalized according to Equation (20) to yield normalized white point values $nABC_{wcurr}$:

$$nA_{wcurr} = \frac{A_{wcurr}}{A_{wcurr} + B_{wcurr} + C_{wcurr}} \quad (20)$$

$$nB_{wcurr} = \frac{B_{wcurr}}{A_{wcurr} + B_{wcurr} + C_{wcurr}}$$

$$nC_{wcurr} = \frac{C_{wcurr}}{A_{wcurr} + B_{wcurr} + C_{wcurr}}$$

The difference between the target white point values $nABC_{wp}$ and the estimated white point values $nABC_{wcurr}$ at the selected sequence and current levels may be calculated according to Equation (21):

$$\begin{pmatrix} R_{\%diff3} \\ G_{\%diff3} \\ B_{\%diff3} \end{pmatrix} = \frac{\left( \begin{pmatrix} nA_{wp} \\ nB_{wp} \\ nC_{wp} \end{pmatrix} - \begin{pmatrix} nA_{wcurr} \\ nB_{wcurr} \\ nC_{wcurr} \end{pmatrix} \right)}{\begin{pmatrix} nA_{wp} \\ nB_{wp} \\ nC_{wp} \end{pmatrix}} + 1 \quad (21)$$

The difference may be normalized according to Equation (22) so that the maximum percent difference is one:

$$nR_{\%diff3} = \frac{R_{\%diff3}}{\max(R_{\%diff3}, G_{\%diff3}, B_{\%diff3})} \quad (22)$$

$$nG_{\%diff3} = \frac{G_{\%diff3}}{\max(R_{\%diff3}, G_{\%diff3}, B_{\%diff3})}$$

$$nB_{\%diff3} = \frac{B_{\%diff3}}{\max(R_{\%diff3}, G_{\%diff3}, B_{\%diff3})}$$

The next p7 matrix corresponding to the difference is established at step 136. The next p7 matrix may be calculated according to Equation (23):

$$p7 = p7_i \; column7 * \begin{pmatrix} nR_{\%diff3} \\ nG_{\%diff3} \\ nB_{\%diff3} \end{pmatrix} \quad (23)$$

After determining the next p7 matrix, the method terminates.

The illustrated embodiment describes estimating adjustments to achieve a target white point value. Any target color value, however, can be used. According to one embodiment, a target primary value may be given, and the method may estimate adjustments to achieve the target primary value. According to another embodiment, the duty cycle sequence changes may not be used. Instead, major adjustments may be performed by increasing current levels for one or more primaries. The p7 matrix may be used to provide minor adjustments.

Modifications, additions, or omissions may be made to the method without departing from the scope of the invention. The method may include more, fewer, or other steps. Additionally, steps may be performed in any suitable order without departing from the scope of the invention.

Certain embodiments of the invention may provide one or more technical advantages. A technical advantage of one embodiment may be that current levels and duty cycle sequences provided to a light source array are synchronized in order to manage the color temperature or xy location of the array. The color management may yield an appropriate color temperature or xy location while optimizing the lumens output of the light source array.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for providing color management, comprising:
   receiving a plurality of measurements of the intensity of a plurality of colors, a light source generating a plurality of light beams to yield the plurality of colors, the plurality of light beams generated in accordance to image data to create an image;
   establishing a target color value;
   selecting a duty cycle sequence in accordance with the plurality of measurements and the target color value, the duty cycle sequence operable to control the light source; and
   selecting one or more current levels in accordance with the duty cycle sequence and the target color value, the one or more current levels being for one or more currents provided to the light source.

2. The method of claim 1, wherein selecting the duty cycle sequence further comprises:
   establishing a plurality of target values corresponding to the target color value;
   establishing a plurality of first measured values from the plurality of measurements;
   determining a first difference between the target values and the first measured values; and
   selecting a duty cycle sequence corresponding to the first difference.

3. The method of claim 1, wherein selecting the duty cycle sequence further comprises:
   determining a candidate duty cycle sequence in accordance with the target color value and the plurality of measurements; and
   selecting an available duty cycle sequence that is closest to the candidate duty cycle sequence.

4. The method of claim 1, wherein selecting the one or more current levels further comprises:
   establishing a plurality of target values corresponding to the target color value;
   establishing a plurality of second measured values corresponding to the selected duty cycle sequence;
   determining a second difference between the target values and the second measured values; and
   selecting one or more current levels corresponding to the second difference.

5. The method of claim 1, further comprising generating a next p7 matrix by:
   establishing a plurality of target values corresponding to the target color value;
   establishing a plurality of third measured values corresponding to the selected duty cycle sequence and the selected one or more current levels;
   determining a third difference between the target values and the third measured values; and
   generating the next p7 matrix from the third difference.

6. The method of claim 1, wherein the plurality of measurements comprise:
   a plurality of internal measurements, an internal measurement measured at a portion of an optical path prior to a screen with the image is created; and
   a plurality of external measurements, an external measurement measured at a portion of the optical path posterior to the screen.

7. The method of claim 1, wherein receiving the plurality of measurements further comprises:
   receiving the plurality of measurements comprising a plurality of internal measurements and a plurality of external measurements; and
   scaling the internal measurements and the external measurements.

8. The method of claim 1, further comprising providing control information, the control information instructing a light source driver to provide the one or more currents to the light source at the one or more selected current levels.

9. The method of claim 1, further comprising providing control information, the control information instructing the light source to operate according to the selected duty cycle sequence.

10. A color manager for providing color management, comprising:
    an interface operable to:
       receive a plurality of measurements of the intensity of a plurality of colors, a light source generating a plurality of light beams to yield the plurality of colors, the plurality of light beams generated in accordance to image data to create an image;
    a processor coupled to the interface and operable to:
       establish a target color value;

select a duty cycle sequence in accordance with the plurality of measurements and the target color value, the duty cycle sequence operable to control the light source; and select one or more current levels in accordance with the duty cycle sequence and the target color value, the one or more current levels being for one or more currents provided to the light source.

11. The color manager of claim 10, the processor further operable to select the duty cycle sequence by:

establishing a plurality of target values corresponding to the target color value;

establishing a plurality of first measured values from the plurality of measurements;

determining a first difference between the target values and the first measured values; and selecting a duty cycle sequence corresponding to the first difference.

12. The color manager of claim 10, the processor further operable to select the duty cycle sequence by:

determining a candidate duty cycle sequence in accordance with the target color value and the plurality of measurements; and selecting an available duty cycle sequence that is closest to the candidate duty cycle sequence.

13. The color manager of claim 10, the processor further operable to select the one or more current levels by:

establishing a plurality of target values corresponding to the target color value;

establishing a plurality of second measured values corresponding to the selected duty cycle sequence;

determining a second difference between the target values and the second measured values; and selecting one or more current levels corresponding to the second difference.

14. The color manager of claim 10, the processor further operable to generate a next p7 matrix by:

establishing a plurality of target values corresponding to the target color value;

establishing a plurality of third measured values corresponding to the selected duty cycle sequence and the selected one or more current levels;

determining a third difference between the target values and the third measured values; and generating the next p7 matrix from the third difference.

15. The color manager of claim 10, wherein the plurality of measurements comprise:

a plurality of internal measurements, an internal measurement measured at a portion of an optical path prior to a screen with the image is created; and a plurality of external measurements, an external measurement measured at a portion of the optical path posterior to the screen.

16. The color manager of claim 10, the processor further operable to receive the plurality of measurements by:

receiving the plurality of measurements comprising a plurality of internal measurements and a plurality of external measurements; and scaling the internal measurements and the external measurements.

17. The color manager of claim 10, the processor further operable to provide control information, the control information instructing a light source driver to provide the one or more currents to the light source at the one or more selected current levels.

18. The color manager of claim 10, the processor further operable to provide control information, the control information instructing the light source to operate according to the selected duty cycle sequence.

19. A system for providing color management, comprising:

means for receiving a plurality of measurements of the intensity of a plurality of colors, a light source generating a plurality of light beams to yield the plurality of colors, the plurality of light beams generated in accordance to image data to create an image;

means for establishing a target color value;

means for selecting a duty cycle sequence in accordance with the plurality of measurements and the target color value, the duty cycle sequence operable to control the light source; and means for selecting one or more current levels in accordance with the duty cycle sequence and the target color value, the one or more current levels being for one or more currents provided to the light source.

20. A method for providing color management, comprising:

receiving a plurality of measurements of the intensity of a plurality of colors, a light source generating a plurality of light beams to yield the plurality of colors, the plurality of light beams generated in accordance to image data to create an image, receiving the plurality of measurements further comprising:

receiving the plurality of measurements comprising:

a plurality of internal measurements, an internal measurement measured at a portion of an optical path prior to a screen with the image is created; and a plurality of external measurements, an external measurement measured at a portion of the optical path posterior to the screen; and scaling the internal measurements and the external measurements;

establishing a target color value;

selecting a duty cycle sequence in accordance with the plurality of measurements and the target color value, the duty cycle sequence operable to control the light source, selecting the duty cycle sequence further comprising:

establishing a plurality of target values corresponding to the target color value;

establishing a plurality of first measured values from the plurality of measurements;

determining a first difference between the target values and the first measured values;

selecting a candidate duty cycle sequence corresponding to the first difference;

selecting an available duty cycle sequence that is closest to the candidate duty cycle sequence; and selecting one or more current levels in accordance with the duty cycle sequence and the target color value, the one or more current levels being for one or more currents provided to the light source, selecting the one or more current levels further comprising:

establishing a plurality of target values corresponding to the target color value;

establishing a plurality of second measured values corresponding to the selected duty cycle sequence;

determining a second difference between the target values and the second measured values; and selecting one or more current levels corresponding to the second difference; and generating a next p7 matrix by:

establishing a plurality of target values corresponding to the target color value;

establishing a plurality of third measured values corresponding to the selected duty cycle sequence and the selected one or more current levels;

determining a third difference between the target values and the third measured values;

generating the next p7 matrix from the third difference; and providing control information, the control information instructing a light source driver to provide the one or more currents to the light source at the one or more selected current levels, the control information instructing the light source to operate according to the selected duty cycle sequence.

* * * * *